US012085183B2

(12) United States Patent
Hay et al.

(10) Patent No.: US 12,085,183 B2
(45) Date of Patent: Sep. 10, 2024

(54) VALVE

(71) Applicant: RELIANCE WORLDWIDE CORPORATION (AUST.) PTY. LTD., Eagle Farm (AU)

(72) Inventors: Gary Hay, Eagle Farm (AU); Blake Anton Phillips, Eagle Farm (AU)

(73) Assignee: RELIANCE WORLDWIDE CORPORATION (AUST) PTY. LTD., Eagle Farm (AU)

( * ) Notice: Subject to any disclaimer, the term of this patent is extended or adjusted under 35 U.S.C. 154(b) by 0 days.

(21) Appl. No.: 17/998,547

(22) PCT Filed: May 12, 2021

(86) PCT No.: PCT/AU2021/050445
§ 371 (c)(1),
(2) Date: Nov. 11, 2022

(87) PCT Pub. No.: WO2021/226671
PCT Pub. Date: Nov. 18, 2021

(65) Prior Publication Data
US 2023/0204113 A1    Jun. 29, 2023

(30) Foreign Application Priority Data
May 13, 2020   (AU) ................................ 2020901540

(51) Int. Cl.
*F16K 17/30*   (2006.01)
*F16K 5/06*    (2006.01)
(Continued)

(52) U.S. Cl.
CPC ............ *F16K 17/30* (2013.01); *F16K 5/0605* (2013.01); *F16K 17/34* (2013.01); *F16K 27/067* (2013.01);
(Continued)

(58) Field of Classification Search
CPC ...... F16K 15/18; F16K 15/182; F16K 15/184; F16K 15/1848; Y10T 137/7727; Y10T 137/7729; Y10T 137/8803
See application file for complete search history.

(56) References Cited

U.S. PATENT DOCUMENTS 1,622,406 A * 3/1927 Wilhjelm ................ F16K 5/106
                                                    137/614.17
3,441,052 A    4/1969 Schilling
(Continued)

FOREIGN PATENT DOCUMENTS

CN    103256415 A    8/2013
CN    103322257 A    9/2013
(Continued)

OTHER PUBLICATIONS

Search Report; Australian Patent Application No. 2020901540; Jun. 25, 2020.
(Continued)

*Primary Examiner* — Robert K Arundale
(74) *Attorney, Agent, or Firm* — Barnes & Thornburg LLP (57) ABSTRACT

A valve including a valve body; an adjusting assembly having an actuating portion and a regulating part; a flood prevention device at least partly located in the valve body, with the flood prevention device having a regulating portion; and a relief aperture defined through a wall of the regulating part to assist in reducing pressure on the regulating portion when the regulating portion moves to a closed position.

18 Claims, 5 Drawing Sheets

(51) Int. Cl.
*F16K 17/34* (2006.01)
*F16K 27/06* (2006.01)
*F16K 31/122* (2006.01)

(52) U.S. Cl.
CPC ..... *F16K 31/1223* (2013.01); *Y10T 137/7727* (2015.04)

(56) References Cited

U.S. PATENT DOCUMENTS

| | | | | |
|---|---|---|---|---|
| 5,076,321 | A | * | 12/1991 | Terry ................. F16K 37/0058 137/460 |
| 5,755,259 | A | * | 5/1998 | Schulze ................. F16L 47/03 137/460 |
| 6,003,550 | A | * | 12/1999 | Saarem ................. F16K 5/0407 137/460 |
| 7,178,544 | B2 | | 2/2007 | Robison |
| 2004/0074542 | A1 | * | 4/2004 | Flauzac ................. F16K 5/0605 137/614.17 |
| 2005/0022872 | A1 | * | 2/2005 | Robison ................. F16K 17/30 137/460 |
| 2011/0260090 | A1 | * | 10/2011 | Jones ................. F16K 5/0605 251/315.16 |
| 2014/0299209 | A1 | * | 10/2014 | Oh ................. F16K 5/06 137/613 |

FOREIGN PATENT DOCUMENTS

| | | |
|---|---|---|
| CN | 106499849 A | 3/2017 |
| EP | 1508730 A1 | 2/2005 |
| EP | 3106720 A1 | 12/2016 |
| FR | 2828547 A3 | 2/2003 |
| GB | 1418245 | 12/1975 |
| JP | H0272873 U | 6/1990 |
| JP | S6429574 U | 3/1992 |
| JP | 2006052800 A | 2/2006 |
| WO | 7900212 A1 | 4/1979 |

OTHER PUBLICATIONS

Search Report; International Patent Application No. PCT/AU2021/050445; Jun. 21, 2021.
FloodGuard; Hose Burst Safety Valve; Information Sheet; Jun. 1999.
FloodGuard; RMC Water Valves; Information Sheet; Feb. 12, 2014.
International Preliminary Report on Patentability; International Patent Application No. PCT/AU2021/050445; Nov. 15, 2022.
Extended European Search Report; European Patent Application No. 21803430.4; May 3, 2024.

\* cited by examiner

VALVE

PRIORITY CLAIM

This patent application is a U.S. National Phase of International Patent Application No. PCT/AU2021/050445, filed May 12, 2021, which claims priority to Australian Patent Application No. 2020901540, filed May 13, 2020, the disclosures of which are incorporated herein by reference in their entireties.

FIELD

This disclosure relates to a valve, and in particular, a valve incorporating a flood prevention device. This disclosure also relates to methods associated with such a valve. Other aspects also are described.

BACKGROUND

Reference to background art herein is not to be construed as an admission that such art constitutes common general knowledge in Australia or elsewhere.

For ease of use, taps are regularly left on when connected to appliances in a building. For example, washing machines, dishwashers and so forth typically have an 'open' tap connected thereto whilst the appliance remains idle. This allows a user to conveniently turn on the appliance, when required, as opposed to having to also repeatedly open and close the tap. The taps are also generally located in difficult positions to access. However, a common cause of internal flooding in buildings is a burst/leaking hose and the like when connected to these appliances. If left unattended for a period of time, considerable water damage can be caused to a building, such as when a hose breaks.

One current method of reducing the risk associated with flooding from a burst/damaged hose is the use of a flood stop device. Flood stop devices work on the basis that when a fluid flow exceeds a certain point, which typically occurs when there is a burst or leaking hose, a piston overcomes a spring force and seals against a face to stop the flow of fluid. That said, once this occurs, it is typically difficult to reset the flood stop device to its initial condition. Normally a mains water supply needs to be turned off to allow the water supply pressure to be reduced to a point where the spring can overcome the force on the piston and, in some cases, the flood stop device needs to be disconnected from the system to reduce the pressure. Therefore there is an advantage in developing an improved mechanism for easily resetting a flood stop device, and bearing this in mind, the present inventors have developed an improved valve.

The aim of the present disclosure is to address the foregoing and other related, and unrelated, issues, or to at least provide a useful alternative.

SUMMARY

In one form, a valve comprises: a valve body; an adjusting assembly having an actuating portion and a regulating part; a flood prevention device at least partly located in the valve body, with the flood prevention device having a regulating portion, and a relief aperture defined through a wall of the regulating part to assist in reducing pressure on the regulating portion when it has moved to a closed position.

In an embodiment, the relief aperture faces in a flow direction through the valve body as it is relieving pressure on the regulating portion.

In an embodiment, the relief aperture faces towards an outlet of the valve body as it is relieving pressure on the regulating portion.

In an embodiment, moving the actuating portion adjusts (or rotates) the regulating portion to a position that reduces pressure on the regulating portion to assist the regulating portion returning from the closed position to an open position.

In an embodiment, the regulating portion is: biased towards the open position with a biasing member; and configured to move to the closed position to restrict fluid flow through the valve body in response to a predetermined fluid rate.

In another form, a valve comprises: a valve body; an adjusting assembly having an actuating portion and a regulating part; and a flood prevention device at least partly located in the valve body. The flood prevention device has a regulating portion that is: biased towards an open position with a biasing member; and configured to move to a closed position to restrict fluid flow through the valve body in response to a predetermined fluid rate. Moving the actuating portion adjusts the regulating portion to a position that reduces pressure on the regulating portion to assist the regulating portion returning from the closed position to the open position. The regulating part includes a relief aperture through a wall thereof to assist in reducing pressure on the regulating portion.

In an embodiment, the actuating portion adjusts the regulating portion in a direction that is transverse to that defined by the regulating portion moving from the open position to the closed position.

In an embodiment, rotating the actuating portion adjusts the regulating portion.

In an embodiment, moving the actuating portion rotates the regulating portion.

In an embodiment, the actuating portion rotates the regulating portion about an axis that is transverse to a direction defined by fluid passing over the regulating portion.

In an embodiment, an axis defines a pivot point where the actuating portion and the regulating portion rotate therearound.

In an embodiment, the actuating portion and the regulating portion simultaneously rotate around the axis.

In an embodiment, the regulating portion includes an inlet aperture and one or more side apertures.

In an embodiment, the inlet aperture extends transversely to the one or more side apertures.

In an embodiment, the inlet aperture extends perpendicular to the one or more side apertures.

In an embodiment, the inlet aperture extends at an angle between approximately 45 to 90 degrees to the one or more side apertures.

In an embodiment, the inlet aperture extends at an angle between approximately 60 to 90 degrees to the one or more side apertures.

In an embodiment, the inlet aperture extends at an angle between approximately 70 to 90 degrees to the one or more side apertures.

In an embodiment, the inlet aperture extends at an angle between approximately 80 to 90 degrees to the one or more side apertures.

In an embodiment, the inlet aperture extends at an angle up to approximately 90 degrees to the one or more side apertures.

In an embodiment, the inlet aperture extends at an angle up to approximately 60 degrees to the one or more side apertures.

In an embodiment, the inlet aperture extends at an angle of approximately 45, 60 or 90 degrees, or any other suitable angle, to the one or more side apertures.

In an embodiment, opposite the inlet aperture of the regulating portion is a closed end.

In an embodiment, the regulating part forms part of a retaining portion that assists in retaining at least part of the flood prevention device.

In an embodiment, the retaining portion retains the regulating portion and/or the biasing member.

In an embodiment, the regulating portion and/or the biasing member are located in the valve.

In an embodiment, the regulating portion and/or the biasing member are substantially retained within the retaining portion.

In an embodiment, the biasing member engages with a seat within the retaining portion and biases the regulating portion towards a retaining part.

In an embodiment, the regulating part includes an aperture therethrough.

In an embodiment, the aperture extends transversely to the relief aperture.

In an embodiment, the regulating part moves between a flow position to an off position. In the flow position, fluid may flow through the aperture.

In an embodiment, the regulating part rotates between the flow position to the off position.

In an embodiment, the regulating part allows fluid to pass to the flood prevention device in the flow position.

In an embodiment, the regulating part assists with preventing fluid flow to the flood prevention device in the off position.

In an embodiment, in response to the regulating part being in the off position, the regulating portion is assisted with returning from the closed position to the open position.

In an embodiment, the relief aperture extends through the wall of the regulating part that is spherical.

In an embodiment, the wall with the relief aperture is opposite a wall that prevents fluid flow to the flood prevention device in the off position.

In an embodiment, the relief aperture is located on one side of the regulating part whilst an opposite side of the regulating part includes a substantially uniform outer surface.

In an embodiment, the regulating part is at least partly in the form of a sphere.

In an embodiment, the actuating portion is connected to the retaining portion.

In an embodiment, the retaining portion is configured to seal with at least part of the valve body.

In an embodiment, the retaining portion includes an aperture sealing portion.

In an embodiment, in response to the regulating portion engaging with the aperture sealing portion, fluid flow through the valve body is restricted.

In an embodiment, the regulating portion includes a sealing interface that is configured to engage with the aperture sealing portion.

In an embodiment, the biasing member is in the form of a spring.

In a further embodiment, the biasing member forms part of the regulating portion.

In an embodiment, the actuating portion rotates the regulating portion about an axis that is transverse to a direction defined by a force of the biasing member on the regulating portion.

In a further form, a method of operating a flood prevention device comprises: allowing a regulating portion of the flood prevention device to move from an open position to a closed position in response to a predetermined fluid rate; moving the regulating portion from a first position to a second position within a valve body, with the assistance of an actuating portion, to reduce a pressure on the regulating portion; and allowing the regulating portion to return from the closed position to the open position as fluid drains from a relief aperture.

In an embodiment, moving the regulating portion from the open position to the closed position, in response to a predetermined fluid rate, includes engaging a sealing interface of the regulating portion with an aperture sealing portion.

In an embodiment, the step of moving the regulating portion from the first position to the second position includes rotating the regulating portion.

In an embodiment, the regulating portion is rotated by pivoting it about an axis.

In an embodiment, the step of moving the regulating portion from the first position to the second position includes rotating the actuating portion.

In an embodiment, the step of moving the actuating portion includes moving a regulating part from a flow position to an off position.

In an embodiment, the step of moving the regulating part from the flow position to the off position includes moving a wall of the regulating part into a position that prevents flow of fluid through the valve body.

In an embodiment, allowing the regulating portion to return from the closed position to the open position as fluid drains from the relief aperture includes fluid leaving through a side wall of the regulating part.

In an embodiment, the step of allowing the regulating portion to return from the closed position to the open position includes biasing the regulating portion to the open position.

In an embodiment, the method further includes moving the regulating part from the off position to the flow position in order to allow the regulating portion to regulate fluid flow through the valve body from the open position.

In another form, the present disclosure includes a method of reducing flood risk and any related damage to property associated with a leaking pipe, the method including providing a valve described herein upstream from a pipe connected to a device.

The device may send or receive fluid via the pipe. The pipe may be a hose.

The device may be an appliance such as washing machine, dishwasher, water chiller/filter, toilet cistern, and so forth.

The valve would also be functional on hard-plumbed pipe systems to control water supplies to kitchens, bathrooms and, for instance, outdoor irrigation systems to reduce risk of flooding.

Further features and advantages of the present invention will become apparent from the following detailed description.

BRIEF DESCRIPTION OF THE DRAWINGS

By way of example only, embodiments of the present disclosure will be described more fully hereinafter with reference to the accompanying figures, in which.

DETAILED DESCRIPTION

Figure 1:
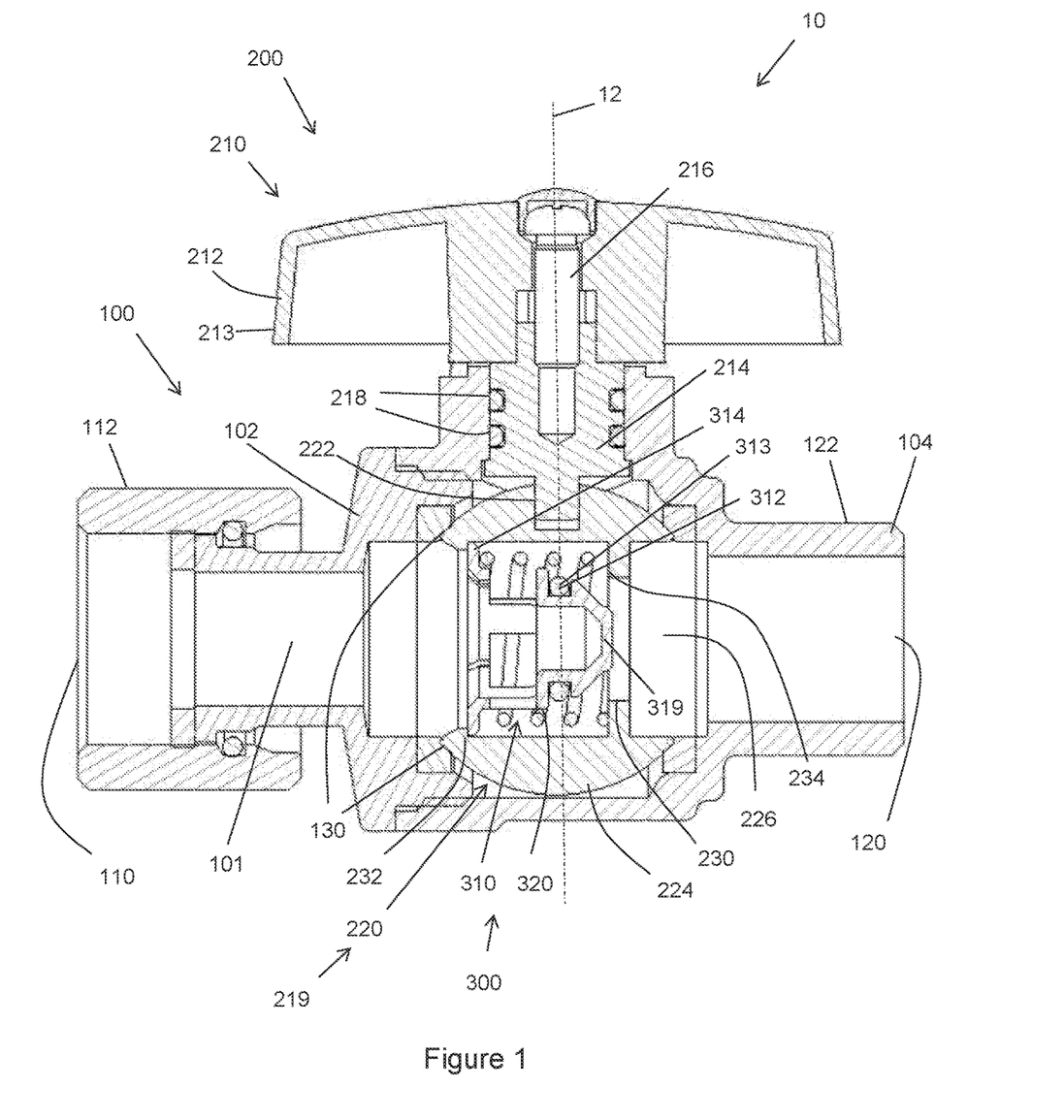
FIG. 1 illustrates a sectional view of a valve, according to an embodiment of the present disclosure, with a regulating portion in an open position and a regulating part in a flow position.

FIG. 1 illustrates a valve 10 according to an embodiment of the present disclosure. The valve 10 includes a valve body 100, an adjusting assembly 200, and a flood prevention device 300.

Figure 5:
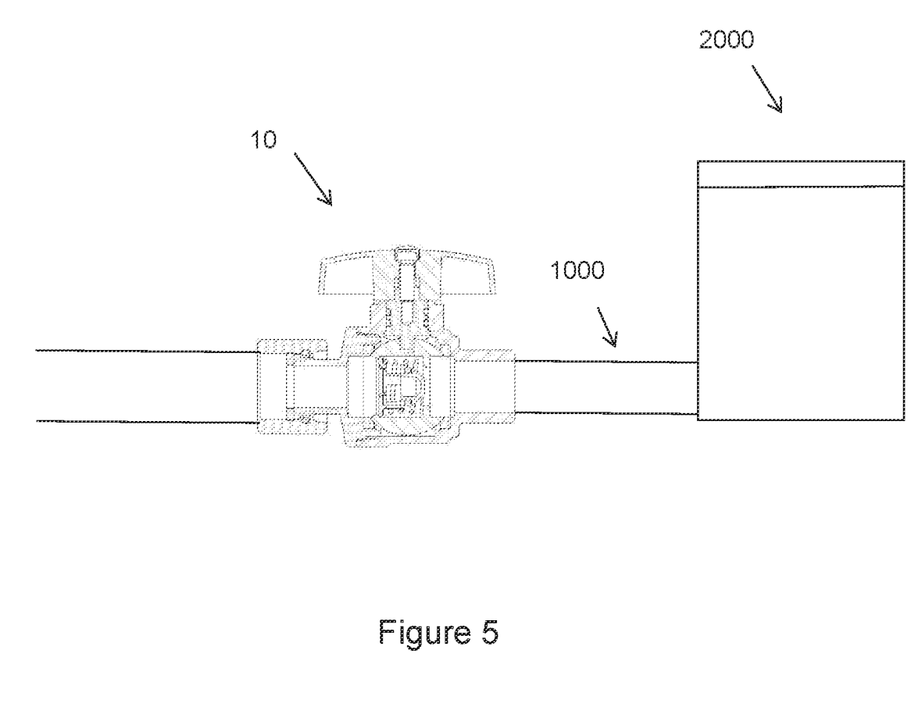
FIG. 5 illustrates a sectional view of the valve shown in FIG. 1 connected to another part of a water system.

The valve body 100 is formed from (amongst other things) a first part 102 connected to a second part 104. The valve body 100 includes an inlet 110 and an outlet 120. The inlet 110 includes an inlet attachment portion 112 associated therewith. The inlet attachment portion 112 is in the form of a captive nut. The outlet 120 includes an outlet attachment portion 122 associated therewith in the form of a thread. The attachment portions 112, 122 assist in connecting the valve 10 to further parts of, for instance, a water system. That is, the valve 10 may be connected to a fluid conduit, such as a pipe in the form of hose 1000, upstream of a device in the form of an appliance 2000 (as shown in FIG. 5). In further embodiments, one or both of the attachment portions 112, 122 may also take the form of a push-to-connect fitting.

The valve body 100 includes an aperture or passage 101 therethrough. The aperture 101 extends from the inlet 110 to the outlet 120. The aperture 101 extends substantially perpendicular to an axis 12 in this embodiment. The aperture 101 is configured to receive the flood prevention device 300 therein. In addition, as outlined in further detail below, the valve body 100 also receives at least part of the adjusting assembly 200 therein. Separately, the valve body 100 also includes sealing portions 130. The sealing portions 130 are configured to engage with part of the adjusting assembly 200 to assist in regulating fluid flow through the aperture 101 of the valve body 100.

The adjusting assembly 200 includes an actuating portion 210 and a retaining portion 219 that forms a regulating part 220. The axis 12 extends through the adjusting assembly 200 (and flood prevention device 300). The actuating portion 210 includes a handle 212. The handle 212 includes a gripping portion 213 that assists in turning the handle 212. The actuating portion 210 is configured to rotate about the axis 12. That is, the axis 12 defines a pivot point about which handle 212 is turned. The handle 212 is coupled to a connecting portion 214 with a fastener 216. The connecting portion 214 includes sealing portion(s) 218 that assist in fluidly sealing the aperture 101 of the valve body 100 from the handle 212. The connecting portion 214 connects to the regulating part 220 in a manner that allows the handle 212 of the actuating portion 210 to adjust the position of regulating part 220/flood prevention device 300 (as outlined further below).

The regulating part 220 includes a ball or spherical body in this embodiment. The regulating part 220 includes an attaching portion 222 that connects to the connecting portion 214. The attaching portion 222 is in the form of a recess in a wall 224 of the ball. An aperture 226 extends through the regulating part 220. The aperture 226 forms, in part, a retaining part 232 and seat 234 that assists in retaining the flood prevention device 300. The aperture 226 also includes an aperture sealing portion 230 that is configured to engage with part of the flood prevention device 300 to restrict fluid flow through the valve body 100.

The regulating part 220 also includes a relief aperture 228, extending through the wall 224, that assists in allowing fluid to drain when the regulating part 220 is in an off position. The relief aperture 228 extends transversely to the aperture 226. The relief aperture 228 remains in fluid communication with the flood prevention device 300 after it moves to a closed position. As detailed further below, the relief aperture 228 provides a number of non-obvious advantages including allowing the flood prevention device 300 to be isolated from upstream pressure when the regulating part 220 is in the off position. Other devices maintain an upstream pressure on a triggered flood prevention device when the regulating part is in the off position, as there is no relief mechanism, which can make it difficult to reset the flood prevention device.

The flood prevention device 300 includes a regulating portion in the form of piston 310. The piston 310 includes a sealing interface 312. The sealing interface 312 comprises an O-ring 313 recessed into part of the piston 310. The sealing interface 312 is configured to engage with the aperture sealing portion 230 to prevent fluid flowing through the aperture 226 and the valve body 100. In this regard, the piston 310 is located within the aperture 226. The piston 310 includes a stop portion 314 that is configured to engage with retaining part 232 to retain the piston 310 within the retaining portion 219/regulating part 220. The piston 310 is biased by a spring 320 towards the retaining part 232. The spring 320 rests on seat 234. The piston 310 and spring 320 principally extend in direction that is transverse to the axis 12. In this regard, the spring 320 biases piston 310 away from the axis 12. In the configuration shown in FIG. 1, the spring 320 biases the piston 310 towards the fluid passing over the piston 310. To this end, the piston 310 is biased to abut the retaining part 232 with the assistance of the spring 320 in FIG. 1. This positions the piston 310 in an open position where fluid can flow around the piston 310 and out the outlet 120. That is, the piston 310 includes an inlet aperture 316 and one or more side apertures 318. During normal operation, fluid flows through the inlet aperture 316, out the side apertures 318, around the end of the piston 310 and towards the outlet 120. The shape of the piston 310, and use of the inlet and side apertures 316, 318, assists in reducing the pressure drop over the piston 310. The piston 310 also includes a closed end 319, opposite the inlet aperture 316.

Figure 2:
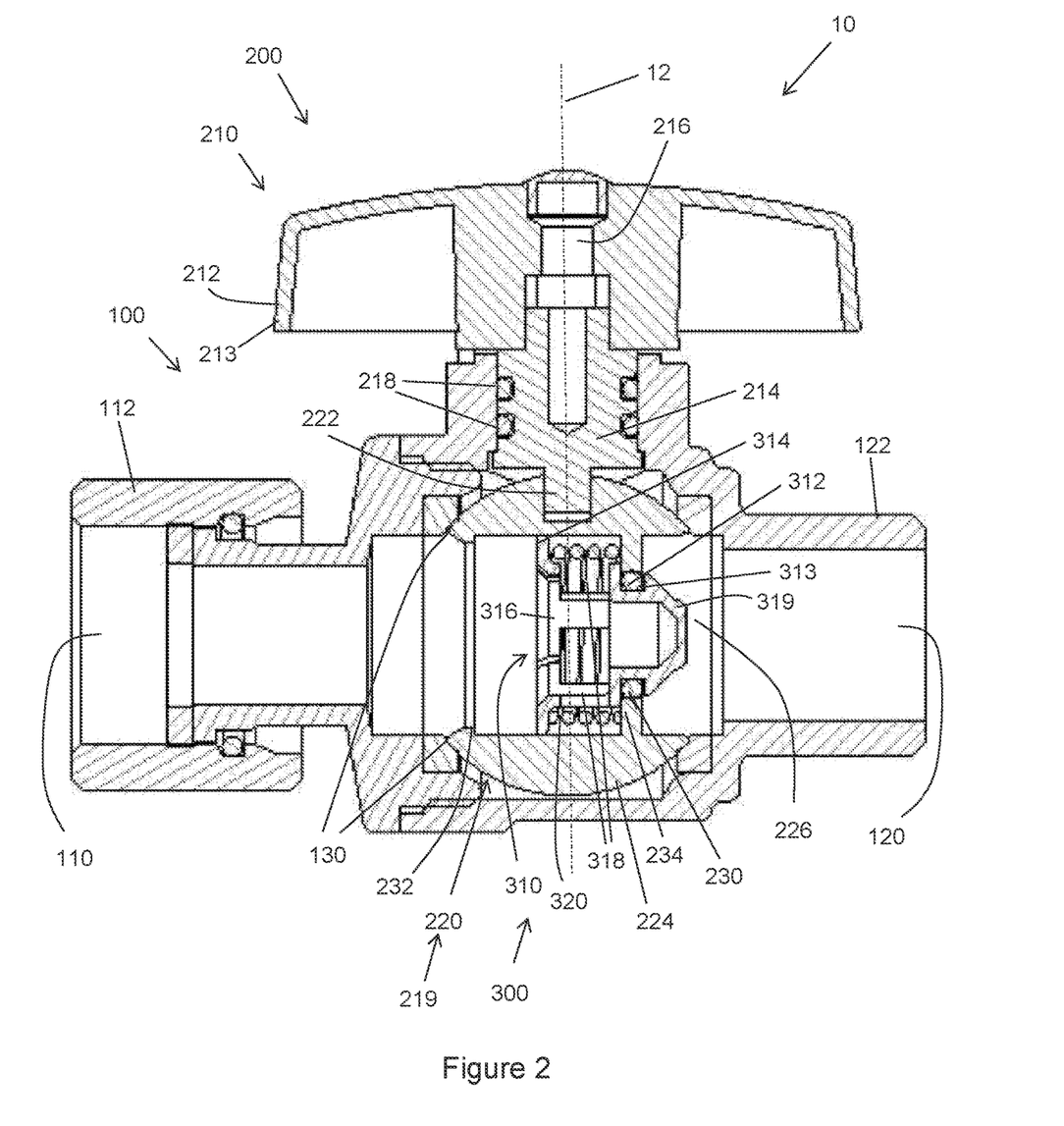
FIG. 2 illustrates a sectional view of the valve shown in FIG. 1 with the regulating portion in a closed position.

In response to fluid flow through the valve body 100 reaching a predetermined fluid rate, the piston 310 is configured to move to a closed position (shown in FIG. 2). That is, in response to the fluid flow applying a certain pressure over the piston 310, the spring 320 compresses and the piston 310 moves to a position where the sealing interface 312 engages with the aperture sealing portion 230. This prevents further fluid from flowing through the inlet 110. By way of a practical example, if a hose downstream of the outlet 120 was to break or otherwise leak (e.g., hose 1000), increasing the fluid rate to or beyond the predetermined fluid rate, the piston 310 will be forced along the valve body 100 such that it engages with the aperture sealing portion 230 to stop the flow of fluid. This helps to reduce flooding of an area downstream of the outlet 120.

Figure 3:
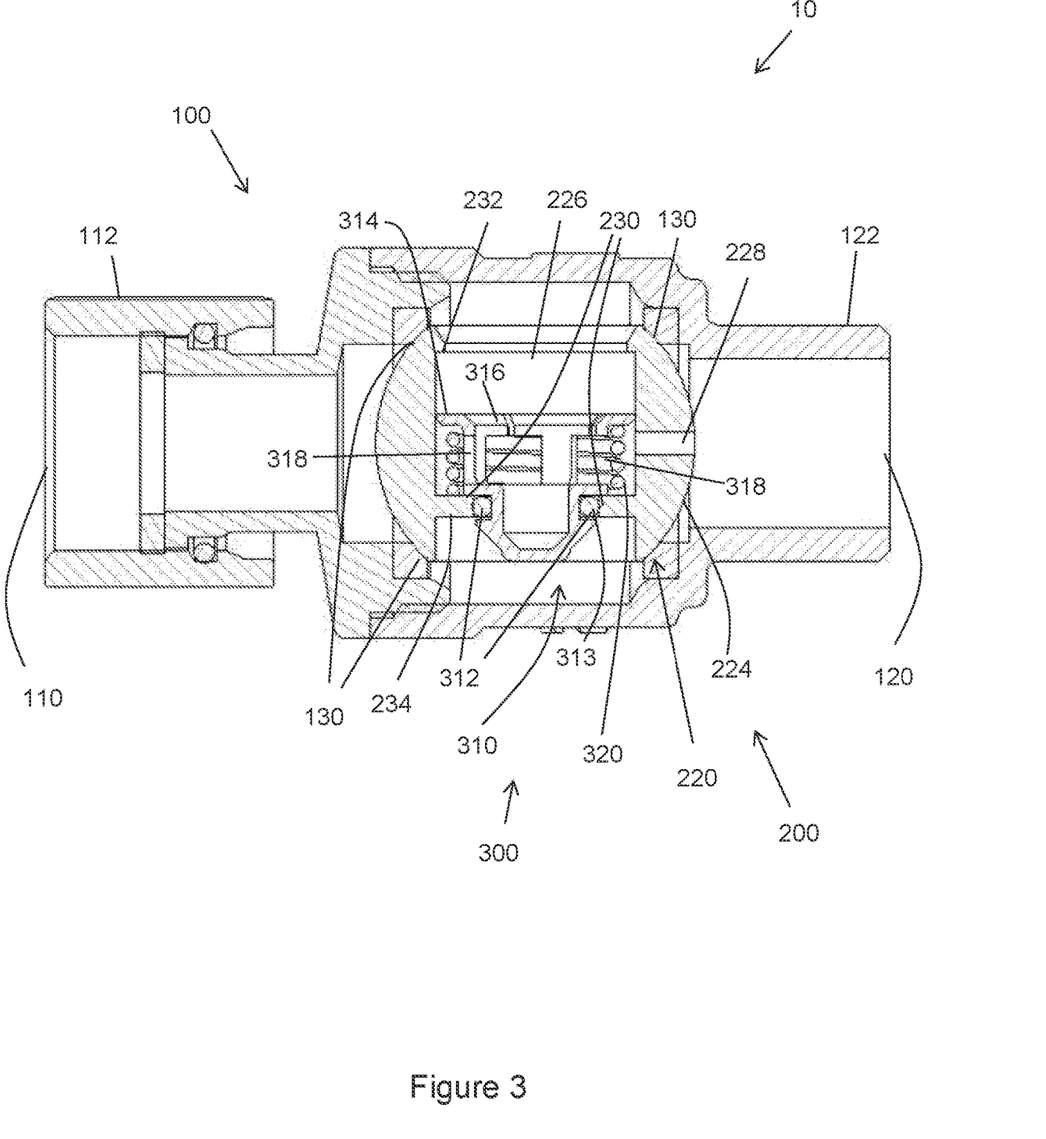
FIG. 3 illustrates a sectional view of the valve shown in FIG. 1 with the regulating part in an off position whilst the regulating portion is in the closed position.

In order to reset the piston 310 to an open position (i.e., FIG. 1), after the downstream issue has been rectified, the handle 212 is rotated about the axis 12. That is, the handle 212 turns about a pivot point defined by the axis 12. As the handle 212 is rotated, the regulating part 220 is rotated about the axis 12 to a position where the wall 224 extends across the aperture 101 of the valve body 100 in order to prevent fluid flowing through the valve body 100. This is an off position for the regulating part 220. In other words, the aperture 226 of the regulating part 220 is rotated to a position where it is not in fluid communication with the aperture 101 extending through the valve body 100. This shown in FIG. 3. The sealing portion 130 assists in preventing fluid passing around regulating part 220.

Figure 4:
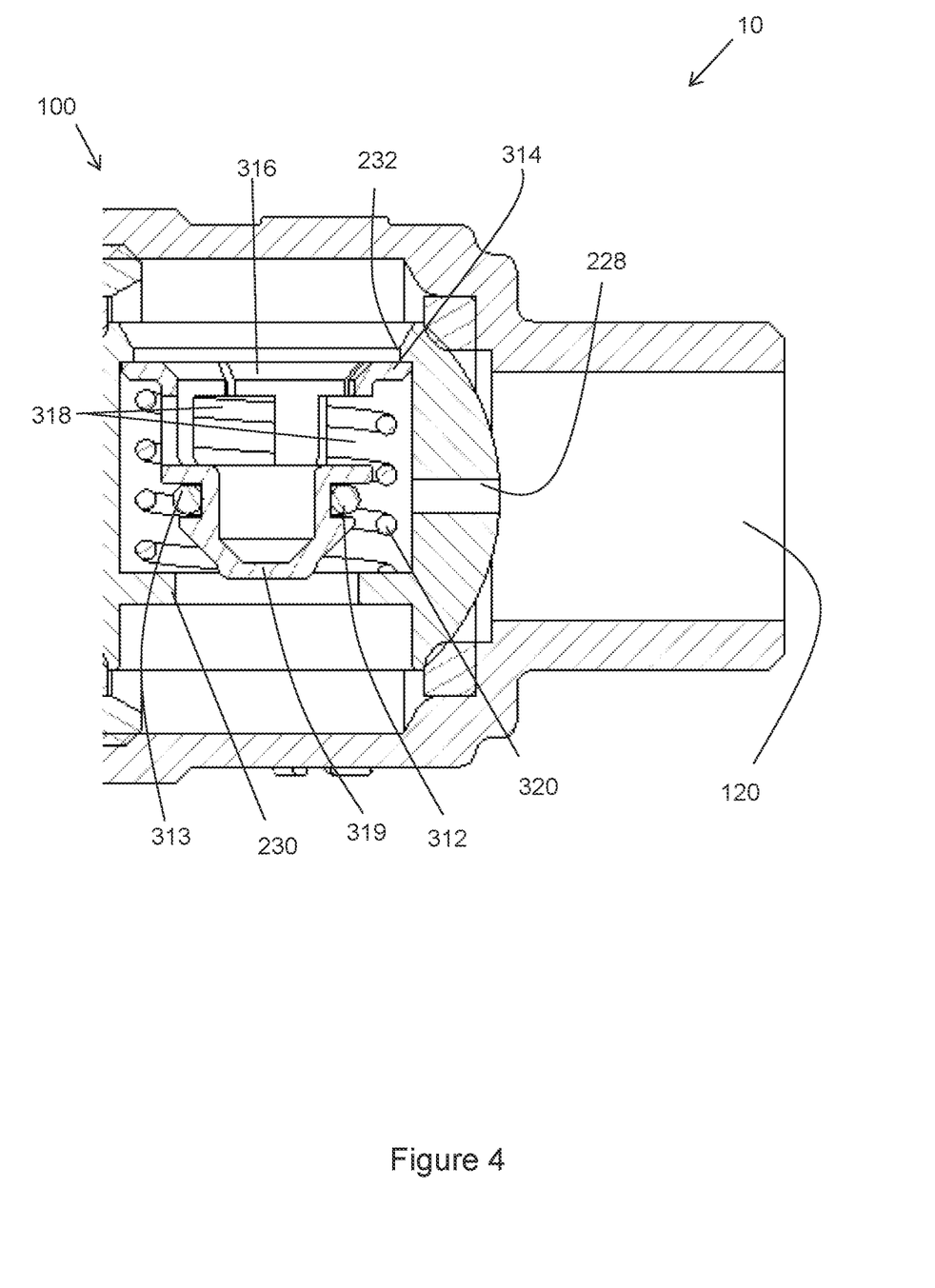
FIG. 4 illustrates a partial sectional view of the valve shown in FIG. 1 with the regulating part in the off position whilst the regulating portion has returned to the open position.

As the regulating part 220 is rotated about the axis 12, the flood prevention device 300 is rotated therewith. More specifically, rotating the handle 212 rotates the piston 310. To this end, the piston 310 and spring 320 are rotated approximately 90° (as is the regulating part 220). This positions the flood prevention device 300 in a location where it is isolated from the fluid flow from the inlet 110. In other words, rotating the handle 212 rotates the piston 310 to a position where it is substantially isolated from fluid flow from the inlet 110. Accordingly, the pressure on the piston 310 is reduced as fluid in the aperture 226 is able to drain through the relief aperture 228. The relief aperture 228 faces towards/is in fluid communication with the outlet 120 as fluid leaves the flow passage around the piston 310, thus relieving pressure on the piston 310. This leaves the relief aperture 228 extending in the fluid flow direction through the valve body 100. Without the relief aperture 228, upstream pressure would be maintained on the piston 310 as the pressure has no means to escape. The relief aperture 228 therefore assists in ensuring the piston 310 can be reset. That is, as pressure on the piston 310 is reduced, the spring 320 can move the piston 310 to allow the stop portion 314 to reengage with the retaining part 232 (as shown in FIG. 4). In other words, the spring 320 can overcome the force of the sealing interface 312 on the aperture sealing portion 230 and bias the piston 310 towards the open position. To this end, the piston 310 moves in a direction that is transverse to the axis 12.

Once the piston 310 has returned to the open position, as indicated in FIG. 4, the flood prevention device 300 has been reset to a configuration where it can regulate fluid flow again. Accordingly, by rotating the handle 212 back to its initial position, the valve 10 is returned to the configuration shown in FIG. 1. The valve 10 may then continue to regulate fluid flow therethrough, e.g., when the downstream issue has been remedied.

The valve 10 provides a convenient mechanism for resetting the flood prevention device 300 after it helps to reduce, inhibit, or in some instances prevent water damage from a burst hose. By simply rotating the handle 212, the piston 310 is adjusted to a position that reduces the pressure thereon in order to allow it to move from its closed position back to its open position. Following this, the handle 212 can simply be rotated back to its initial position and normal operation of the fluid system can resume (after the downstream issue has been fixed). Disassembly parts of the plumbing system are not required and the valve 10 provides a reliable mechanism for resetting the piston 310 to its open position.

Furthermore, as will be appreciated by a person skilled in the art, the valve 10 largely takes the form of a ball valve in this embodiment. However, it would be appreciated in further embodiments that, for example, a gate valve, a globe valve and so forth may be implemented (bearing in mind that the regulating portion needs to be adjusted to a position that reduces pressure thereon).

The valve 10 may also be used in place of standard (ball) valves without substantive comprises in performance or space. This is of commercial importance as, for example, the valve 10 can suitable be retrofitted/specified in water systems. Furthermore, whilst the valve 10 may be typically used in association with hoses on washing machines, dishwashers, water chillers/filters, toilet cisterns and so forth, it would equally be as functional on hard-plumbed pipe systems to control water supplies to kitchens, bathrooms and, for instance, outdoor irrigation systems.

In this specification, adjectives such as left and right, top and bottom, hot and cold, first and second, and the like may be used to distinguish one element or action from another element or action without necessarily requiring or implying any actual such relationship or order. Where context permits, reference to a component, an integer or step (or the alike) is not to be construed as being limited to only one of that component, integer, or step, but rather could be one or more of that component, integer or step.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The above description relating to embodiments of the present disclosure is provided for purposes of description to one of ordinary skill in the related art. It is not intended to be exhaustive or to limit the invention to a single disclosed embodiment. As mentioned above, numerous alternatives and variations to the present disclosure will be apparent to those skilled in the art from the above teaching. Accordingly, while some alternative embodiments have been discussed specifically, other embodiments will be apparent or relatively easily developed by those of ordinary skill in the art. The present disclosure is intended to embrace all modifications, alternatives, and variations that have been discussed herein, and other embodiments that fall within the spirit and scope of the above description.

| Item List: | |
|---|---|
| Item No | Item |
| 10 | Valve |
| 12 | Axis |
| 100 | Valve Body |
| 101 | Aperture |
| 102 | First Part |
| 104 | Second Part |
| 110 | Inlet |
| 112 | Inlet attachment portion |
| 120 | Outlet |
| 122 | Outlet attachment portion |
| 130 | Sealing portion |
| 200 | Adjusting Assembly |
| 210 | Actuating portion |
| 212 | Handle |
| 213 | Gripping portion |
| 214 | Connecting Portion |
| 216 | Fastener |
| 218 | Sealing portion |
| 219 | Retaining portion |
| 220 | Regulating part (ball) |
| 222 | Attaching portion |
| 224 | Wall |

-continued

Item List:

| Item No | Item |
| --- | --- |
| 226 | Aperture |
| 228 | Relief aperture |
| 230 | Aperture sealing portion |
| 232 | Retaining part |
| 234 | Seat |
| 300 | Flood prevention device |
| 310 | Piston (regulating portion) |
| 312 | Sealing interface |
| 313 | O-ring |
| 314 | Stop portion |
| 316 | Inlet Aperture |
| 318 | Side Aperture |
| 319 | Closed end |
| 320 | Spring |
| 1000 | Hose |
| 2000 | Appliance |

The invention claimed is:

1. A valve, comprising:
a valve body;
an adjusting assembly having an actuating portion and a regulating part, wherein the regulating part includes an aperture defined therethrough;
a flood prevention device at least partly located in the valve body, the flood prevention device having a regulating portion located within the aperture of the regulating part; and
a relief aperture defined through a wall of the regulating part, the relief aperture being in fluid communication with the aperture of the regulating part to assist in reducing pressure on the regulating portion when the regulating portion has moved to a closed position;
wherein, as the pressure on the regulating portion is reduced, the regulating portion resets to allow fluid to flow through the valve; and
wherein the regulating portion includes an inlet aperture and one or more side apertures.

2. The valve of claim 1, wherein the wall with the relief aperture is opposite a wall that prevents fluid flow to the flood prevention device when the regulating part is in an off position.

3. The valve of claim 1, wherein the relief aperture is located on one side of the regulating part while an opposite side of the regulating part includes a substantially uniform outer surface.

4. The valve of claim 1, wherein the relief aperture extends through the wall of the regulating part that is spherical.

5. The valve of claim 1, wherein the inlet aperture extends transversely to the one or more side apertures.

6. The valve of claim 1, wherein the one or more side apertures includes at least two side apertures.

7. The valve of claim 1, wherein a closed end is positioned opposite the inlet aperture of the regulating portion.

8. The valve of claim 1, wherein moving the actuating portion adjusts the regulating portion to a position that reduces pressure on the regulating part to assist the regulating portion returning from the closed position to an open position.

9. The valve of claim 8, wherein the regulating portion is biased toward the open position via a biasing member; and wherein the regulating portion is configured to move to the closed position to restrict fluid flow through the valve body in response to a predetermined fluid rate.

10. The valve of claim 9, wherein a retaining part assists in retaining the regulating portion as the regulating portion is biased by the biasing member into the open position.

11. The valve of claim 10, wherein the biasing member engages with a seat and biases the regulating portion toward the retaining part.

12. The valve of claim 9, wherein the actuating portion rotates the regulating portion about an axis that is transverse to a direction defined by a force of the biasing member on the regulating portion.

13. The valve of claim 1, wherein the relief aperture faces in a flow direction through the valve body as the relief aperture is relieving pressure on the regulating portion.

14. The valve of claim 1, wherein the relief aperture faces toward an outlet of the valve body as the relief aperture is relieving pressure on the regulating portion.

15. The valve of claim 1, wherein the relief aperture is in fluid communication with an outlet of the valve body as the relief aperture is relieving pressure on the regulating portion.

16. A method for operating a flood prevention device in a valve, the method comprising:
allowing a regulating portion of the flood prevention device to move from an open position to a closed position in response to a predetermined fluid rate;
moving the regulating portion from a first position to a second position within a valve body, with the assistance of an actuating portion, to reduce a pressure on a regulating part, the regulating part having an aperture defined therethrough and the regulating portion being positioned within the aperture of the regulating part; and
allowing the regulating portion to return from the closed position to the open position as fluid drains from a relief aperture defined through a wall of the regulating part, the relief aperture being in fluid communication with the aperture of the regulating part to assist in reducing the pressure on the regulating portion when the regulating portion has moved to the closed position;
wherein, as the pressure on the regulating portion is reduced, the regulating portion resets to allow fluid to flow through the valve; and
wherein the regulating portion includes an inlet aperture and one or more side apertures.

17. The method of claim 16, wherein the step of allowing the regulating portion to return from the closed position to the open position as fluid drains from the relief aperture includes fluid leaving through a side wall of a regulating part.

18. A method of reducing flood risk and any related damage to property associated with a leaking pipe, the method including providing the valve of claim 1 upstream from a pipe connected to a device.

* * * * *